US011708856B2

(12) United States Patent
Galea

(10) Patent No.: US 11,708,856 B2
(45) Date of Patent: Jul. 25, 2023

(54) DEVICE FOR MONITORING A SET OF BEARINGS

(71) Applicant: Methode Electronics Malta Ltd., Birkirkara (MT)

(72) Inventor: Alexander Galea, Dingli (MT)

(73) Assignee: Methode Electronics Malta Ltd., Birkirkara (MT)

( * ) Notice: Subject to any disclaimer, the term of this patent is extended or adjusted under 35 U.S.C. 154(b) by 172 days.

(21) Appl. No.: 17/212,047

(22) Filed: Mar. 25, 2021

(65) Prior Publication Data

US 2021/0301868 A1 Sep. 30, 2021

(30) Foreign Application Priority Data

Mar. 27, 2020 (DE) ...................... 10 2020 108 638.5

(51) Int. Cl.
| | |
|---|---|
| *F16C 19/52* | (2006.01) |
| *G01K 3/00* | (2006.01) |
| *G01K 1/024* | (2021.01) |
| *F16C 41/00* | (2006.01) |
| *G01K 1/022* | (2021.01) |

(Continued)

(52) U.S. Cl.
CPC .......... *F16C 19/525* (2013.01); *F16C 41/004* (2013.01); *G01K 1/022* (2013.01); *G01K 1/024* (2013.01); *G01K 1/08* (2013.01); *G01K 1/14* (2013.01); *G01K 1/16* (2013.01); *G01K 3/00* (2013.01); *G01M 13/04* (2013.01); *F16C 41/00* (2013.01); *F16C 43/04* (2013.01);
(Continued)

(58) Field of Classification Search
CPC ...... F16C 19/525; F16C 41/004; F16C 41/00; F16C 43/04; F16C 2233/00; F16C 2326/02; G01K 1/022; G01K 1/024; G01K 1/08; G01K 1/14; G01K 1/16; G01K 3/00; G01K 2215/00; G01M 13/04
See application file for complete search history.

(56) References Cited

U.S. PATENT DOCUMENTS

| | | | | |
|---|---|---|---|---|
| 5,633,628 A | * | 5/1997 | Denny ...................... | B61K 9/04 340/682 |
| 10,739,203 B2 | * | 8/2020 | Choi .................... | H04B 5/0075 |

(Continued)

FOREIGN PATENT DOCUMENTS

DE 102013225711 A1 6/2015

*Primary Examiner* — Nathaniel T Woodward
*Assistant Examiner* — Philip L Cotey
(74) *Attorney, Agent, or Firm* — Thompson Coburn LLP

(57) ABSTRACT

A device monitors the operating temperature of at least one set of bearings in a plurality of sets of bearings. The at least one set of bearings is arranged between a shaft and a carrier. The carrier has at least one temperature sensor that senses the temperature of the at least one set of bearings and generates a signal representative of an operating temperature of the at least one set of bearings. The at least one temperature sensor is operatively electrically connected to at least one controller. The controller processes the signal from the temperature sensor, including determining the operating temperature of the respective at least one set of bearings and whether the operating temperature of the respective at least one set of bearings exceeds at least one threshold temperature. The controller memory holds a unique identifier associated with the at least one bearing set.

12 Claims, 6 Drawing Sheets

(51) Int. Cl.
    *G01M 13/04*     (2019.01)
    *G01K 1/14*     (2021.01)
    *G01K 1/16*     (2006.01)
    *G01K 1/08*     (2021.01)
    *F16C 43/04*     (2006.01)

(52) U.S. Cl.
    CPC ...... *F16C 2233/00* (2013.01); *F16C 2326/02* (2013.01); *G01K 2215/00* (2013.01)

(56) References Cited

U.S. PATENT DOCUMENTS

| | | | | |
|---|---|---|---|---|
| 2001/0030466 | A1* | 10/2001 | Ehrlich | F16C 19/52 303/191 |
| 2003/0048962 | A1* | 3/2003 | Sato | G01M 13/045 374/E13.01 |
| 2006/0170551 | A1* | 8/2006 | Nakamura | F16C 41/008 340/572.1 |
| 2008/0018445 | A1* | 1/2008 | Shimura | B60C 23/0496 374/E1.018 |
| 2008/0317397 | A1* | 12/2008 | Muranaka | F16C 33/78 700/116 |
| 2014/0000373 | A1* | 1/2014 | Soma' | G01M 7/00 73/658 |
| 2014/0321501 | A1* | 10/2014 | Bartonek | G01J 5/0808 374/121 |
| 2015/0081230 | A1* | 3/2015 | Hamilton | G01N 3/00 702/34 |
| 2015/0219525 | A1* | 8/2015 | Hamilton | F16C 19/527 702/34 |
| 2016/0273581 | A1* | 9/2016 | Wallmeier | F16C 41/008 |
| 2019/0344466 | A1* | 11/2019 | Vandergon | G01K 1/143 |
| 2021/0364362 | A1* | 11/2021 | Hingst | G01K 7/01 |

* cited by examiner

DEVICE FOR MONITORING A SET OF BEARINGS

RELATED APPLICATION

This application claims the benefit of German patent application ser. no. DE 10 2020 108 638.5 filed on Mar. 27, 2020, the disclosure of which is incorporated by reference herein.

BACKGROUND AND SUMMARY

The disclosure refers to a device for monitoring the operating temperature of at least one set of bearings of a multitude of sets of bearings.

EP 1 356 530 B1 reveals an apparatus for suppling power to a sensor. Said apparatus has a piezo-electric transducer. The transducer can be deformed by a mechanical energy store. It supplies an electrical voltage for the operation of said sensor.

Nowadays consumers are looking for sensors which are electrically powered. However, said sensor is expected be energy efficient and should not suffer from connector and/or cable failure issues. Also, the sensor should be able to send signals which differ from each other, depending on the magnitude of the parameter, the sensor is measuring.
Solution By way of example, the sets of bearings refer to a wheel of a vehicle. The set of bearings is one of a multitude of sets of bearings of various wheels of said vehicle.

The set of bearings can also be located in the steering or in any other part of said vehicle.

It goes without saying that said set of bearing can also be arranged in any other component of said vehicle. The set of bearings can be part of the drivetrain of the vehicle.

Instead of being located in a vehicle, the bearing can also be located in any other technical and/or mechanical object.

The objects listed above are solved by a device for monitoring the operating temperature of at least one set of bearings of a multitude of sets of bearings.

Advantageously, the set of bearings is arranged radially between a shaft and a hub of the wheel.

In the following, the term "shaft" is equally used as the term "axle".

In one embodiment, the device for monitoring the set of bearings is powered through electrical energy. Further, the device for monitoring the set of bearings comprises at least one temperature sensor and a controller, both related to each set of bearings.

The temperature sensor of the device for monitoring the set of bearings is communicatively related to the controller. The temperature sensor of the device for monitoring the set of bearings of each set of bearings communicates to the respective controller, that an operating temperature of the set of bearings reaches and/or exceeds at least one threshold temperature.

The controller identifies the individual set of bearings exceeding at least one threshold temperature among at least two sets of bearings on the vehicle.
Set of Bearings In the following, by way of example, the set of bearings refers to a wheel. Also, by way of example, the wheel is part of a vehicle.

A set of bearings represent a machine element, constraining a relative motion to a desired motion. The set of bearings reduces a friction between at least two moving parts, generally made from metal.

The set of bearings also prevents the rubbing against each other of at least two parts moving relative to each other, leading two the heating of said parts.

In the vehicle and machine industry the design of a set of bearings provides for the free movement of at least two moving parts relative to each other.

The set of bearings also provide for a free rotation around a fixed shaft or axis.

The set of bearings facilitate the desired motion with a minimized magnitude of friction.

In the following the terms "bearings" and "set of bearings" are used interchangeably.

Rotary bearings for instance comprise at least two rotary components. The rotary component can be a shaft or an axis within a mechanical system.

The rotary set of bearings transfers an axial and a radial load from the source of the load to a structure supporting the set of bearings. The structure supporting the set of bearings is later on referred to as carrier.

In modern manufacturing techniques, a variety of different mechanical bearings is known. Preferably, but not exclusively, a "plane bearing" comprises a shaft which rotates in a recess of a component.

Lubrication is used to reduce the friction and/or the rubbing between said metal component within the set of bearings.

Alternatively, in a so-called "ball bearing", also called "roller bearing", rolling elements are employed to reduce a sliding friction.

Rolling elements can be rollers and/or balls with a circular cross section.

Ball bearings use rollers or balls, which are located between so-called races, being arranged within the bearing.

In the following, the invention refers to the "set of bearings" as a "ball bearing" or a "roller bearing". The ball bearing or the roller bearing, arranged between the hub of a wheel and the axial shaft insures easy rotation of a non-driven wheel, preferably.

A so-called "fluid bearing" represents a non-contact bearing in which the employed load is supported by a gas or a liquid.

In another example, the bearing is provided as a "magnetic bearing". In the magnetic bearing the load is supported by a magnetic field.
Carrier of the Set of Bearings The carrier designates a technical object, on the outer circumference of which, the device for monitoring the set of bearings is located, having a temperature sensor. The temperature sensor can project at least partially into the carrier.

The carrier can take any geometrical shape.

In the following, the invention understands the term carrier of a set of bearings to mean a "hub of a wheel". The hub of the wheel is explained below in further detail.
Vehicle By the term "vehicle", the invention understands a truck or a lorry.

Said vehicle is a machine for different purposes, propelled by an engine.

The term "vehicle" comprises wagons, bicycles or motor propelled vehicles.

Motor vehicles can be motorcycles, cars, buses or trucks.

The vehicle can also run on tracks such as a railway.

It goes without saying that the vehicle can also be a watercraft or an amphibious vehicle.

Also, the vehicle can be an airborne vehicle such as an airplane or a helicopter.

In the following, it is assumed that the vehicle is a truck or a lorry.

Hub of a Wheel

The "hub of a wheel" is a critical sub-assembly of a drive train of a vehicle. It goes without saying, that the carrier of the set of bearings and/or the hub of the wheel in the function of a carrier of the set of bearings can also be part of a machine and/or a part of a device to be used for other purposes than a vehicle.

The "hub of a wheel" is a critical sub-assembly of a drive train. The hub of a wheel supports both the wheel as such and further components of said wheel.

The components of the wheel comprise the suspension of said wheel and/or the braking system. The components may also comprise the drive shaft of the wheel.

The shaft or the axle is rotatable mounted within the set of bearings. There is at least one seal employed to prevent the lubricant from leaking out of the set of bearings.

Device for Monitoring a Set of Bearings

A device for monitoring a set of bearings surveying the state of health of the set of bearings can be implemented both for each individual set of bearings as well as for each individual hub of a wheel.

One of the main aspects representing the health of the set of bearings is the operating temperature of said set of bearings.

The monitoring system warns the driver of a wear of the set of bearings. Thus preventing catastrophic failures of the wheel system. A catastrophic failure of a set of bearings can lead to the wheel of the vehicle catch fire, which again may eventually lead to a burning truck on the side of the road.

At least one critical parameter common for every set of bearings is the operating temperature reaching and/or exceeding at least one preset threshold temperature. A leakage of oil and a sudden failure of the functioning of the set of bearings in the hub of a wheel may be the consequence.

The threshold temperature is referred to in further detail below.

Preferably, but not exclusively, the hub of a wheel is positioned between the brake drums or the disc brake and the drive axel of the truck. It goes without saying that it can also be positioned in a different manner.

The wheel of the truck can be bolted onto said hub of a wheel.

Depending on the construction of the drive train of the truck, the end of the hub of the wheel is provided with at least two splint teeth.

The splint teeth mate with corresponding teeth arranged on the axial shaft.

In motion, the hub of the wheel spins along with the wheel, bolted to the hub of a wheel.

Thus, the axle and the hub of a wheel set the wheel of the truck in rotation on a road. For the sake of identification, each set of bearings of the multitude of sets of bearings is given an individual code number comprising at least one numeric and/or at least one alphanumeric character.

The code number will be referred to in further detail below.

Temperature Sensor

The device for monitoring the operating temperature of at least one set of bearings comprises a temperature sensor or a temperature gradient.

The terms "to measure" and "to sense" have the same meaning in this application.

By way of example, the device for monitoring the operating temperature of at least one set of bearings comprises a parametric device which has a varying property with temperature.

The temperature of the bearings is referred to as an "operating temperature". Said operating temperature lies in a range of temperature values, within which the set of bearings may be safely operated.

The operating temperature ranges from a minimum operating temperature to a peak or maximum operating temperature outside which, the set of bearings may be damaged.

There is a lubricant inside the set of bearings. In case of a ball bearing, there is a lubricant arranged inside the set of bearings to let the balls of the ball bearings run smoothly between inner and outer races of said set of bearings. The lubricant may be an oil or grease.

Also, the lubricant keeps a low coefficient of friction between moving parts, thus enabling the operating temperature on the inside of the set of bearings from rising over a tolerable temperature range.

When the shaft starts rotating relative to the hub of the wheel the set of bearings is arranged between the rotating shaft and the hub of the wheel. Thus, the set of bearings allows a movement of the shaft relative to the stationary hub of the wheel.

Should the lubricant and/or a lubricating film inside the set of bearings be defective, degraded or leaked, increased friction coefficient will result in rapid wear and the operating temperature of the set of bearings rises. A further rise of the operating temperature causes more friction and wear until the bearing destroys itself. This may set the wheel of the vehicle associated to the set of bearings on fire and/or may cause loss of control of the vehicle and/or trailer. At best case, sudden bearing failure will cause extensive down time for the truck.

The temperature sensor of said device for monitoring a set of bearings is an entity and/or a module intended to detect events or changes concerning the temperature, preferably the operating temperature, of said set of bearings. The operating temperature has been referred to in detail above.

The operating temperature of said set of bearings measured and/or sensed by the temperature sensor is transmitted to the controller of the device for monitoring a set of bearings.

The temperature sensor of said device has a sensitivity. The invention refers to the term "sensitivity" of the temperature sensor as a change in the value of the output variable of the temperature sensor transmitted from the temperature sensor to the controller. The change in the value of the output variable "temperature value" of the temperature sensor is set in the relation to the change in the value of the input variable "voltage" of the controller.

The temperature of the set of bearings is measured by the temperature sensor.

Example: if the mercury in a temperature sensor moves 1 cm when the operating temperature of the set of bearings changes by 1° C., then the sensitivity of the temperature sensor is 1 cm/° C.

Thus, the temperature sensor measures the operating temperature of the set of bearings to receive value of the temperature.

Thus, the temperature sensor measures the operating temperature of the set of bearings and preferably, but not exclusively, sets the temperature value in degrees Celsius.

For a transmission to the controller, the operating temperature value given in degree Celsius is converted into a corresponding Volt value.

It goes without saying that for a transmission to the controller the operating temperature can also be converted into another physical quantity.

Components of the Device for Monitoring a Set of Bearings

The device for monitoring a set of bearings comprises a number of components.

One of the components of the device for monitoring a set of bearings can be a printed circuit board (PCB). As referred to below, another component is the energy harvesting system. A further component of the device for monitoring a set of bearings can be composed of an energy storing device and/or a rectifier. There can also be an energy storing device charger and/or a transceiver circuit. Further components of the temperature sensor can comprise an antenna and/or a radio-frequency module (RF-module).

Both the printed circuit board (PCB) and the energy harvesting system are referred to below. The controller of the temperature sensor will also be discussed in further detail below.

A receiver/transmitter circuit is arranged which identifies itself at a preset time interval.

According to the invention, the device for monitoring a set of bearings is mounted onto said carrier of the set of bearings. In the present example, the carrier is the hub of a wheel.

To keep the device for monitoring a set of bearings and/or the components of the device for monitoring a set of bearings, mentioned below, protected from the operating temperature of the set of bearings, the device for monitoring a set of bearings is arranged on the outer circumference of the carrier, facing away from the set of bearings of said wheel.

Cylindrical Portion of the Carrier

The temperature sensor of the device for monitoring a set of bearings is arranged in a recess of the hub of the wheel (carrier). The recess of said hub of a wheel is designed as a cylindrical portion reaching into the hub of the wheel. In the following, the recess is therefore referred to as a cylindrical portion.

The temperature sensor is arranged within the cylindrical portion of the hub of the wheel (carrier), facing away from the device for monitoring a set of bearings, arranged on the outer circumference of the hub of the wheel (carrier).

Inside the cylindrical portion of the hub of the wheel (carrier) the temperature sensor faces towards the set of bearings, sensing the operating temperature of the set of bearings.

Thus, the temperature sensor is distanced from the device for monitoring the set of bearings. With the device for monitoring a set of bearings hold the components of the device for monitoring the set of bearings.

Inside the cylindrical portion the temperature sensor is arranged adjacent to the set of bearings.

In other words, the operating temperature of one set of bearings is detected by at least one temperature sensor of said device for monitoring the set of bearings.

To protect said components of the device for monitoring the set of bearings from an exposition to a high operating temperature of the set of bearings, on the one hand, the device for monitoring the set of bearings, comprising the temperature sensitive components is positioned on the outer circumference of the hub of the wheel.

To measure the operating temperature of the set of bearings as accurately as possible, on the other hand, the temperature sensor of the device for monitoring the set of bearings is arranged adjacent to and/or bordering the set of bearings.

To meet both requirements, the device for monitoring the set of bearings provides a cylindrical portion. The temperature sensor of the device for monitoring the set of bearings is arranged at the end of the cylindrical portion of the device for monitoring the set of bearings, which is adjacent to the set of bearings.

The device for monitoring the set of bearings and its components are arranged at the opposite end of the cylindrical portion, facing away from the set of bearings. The temperature sensor and its components are therefore arranged on the outer circumference of the set of bearings.

Thus, the temperature sensor and the device for monitoring the set of bearings are arranged at opposite ends of the cylindrical portion, respectively.

To measure the operating temperature of the set of bearings as accurately as possible, the temperature sensor is positioned adjacent to said set of bearings. Alternatively, the temperature sensor is arranged neighboring the set of bearings. The temperature sensor may also be arranged bordering the set of bearings of the wheel of the vehicle in the recess of the hub of the wheel (carrier). By way of example the temperature sensor abuts the set of bearings, surrounding the shaft.

Energy Harvesting

The device for monitoring the set of bearings has an energy harvesting means. Within the energy harvesting means electrical energy powering the device for monitoring the set of bearings is generated. Within the energy harvesting means a magnet is provided, moving in a center of a coil.

At least one of a number of vectors of motion runs in a direction of gravity. Another vector of motion runs in an opposite direction. The magnet in the center of the coil is supported by a spring.

The device for monitoring the set of bearings comprises at least one printed circuit board (PCB) and/or an energy harvesting system. The energy harvesting system is arranged within a housing of the device for monitoring the set of bearings.

The energy harvesting system comprises a cylindrical magnet.

The magnet is suspended on a spring element. The magnet moves in the center of a metal coil.

Preferably, the coil is made of copper wire which is wound onto a bobbin. Thus, electrical energy is generated in form of an alternating current (AC). Said alternating current is rectified and the voltage is regulated.

The current generated by the energy harvesting system is used to charge a super capacitor or a battery.

Preferably, in order to further increase the efficiency of the energy harvesting system the magnet is arranged with an orientation of the magnet perpendicular to the shaft and to the ground.

The energy harvesting system requires an independent source of energy. The generated current is temporarily stored in a rechargeable battery.

Instead of a rechargeable battery one can also implement a bank of super capacitors.

To change the generated current from a direct current (DC) to an alternating current (AC), or the other way round, a current converter is employed.

Transmitting Element

The at least one temperature sensor is related at least one transmitting element by means of the said controller.

The at least one transmitting element serves to connect the temperature sensor through the controller of the device for monitoring the set of bearings.

According to the invention, the temperature sensor receives a stimulus (operating temperature) emitted from said set of bearings.

The stimulus is further treated and processed by the controller. Also, the stimulus represents the operating temperature of the set of bearings sensed by the sensing surface. Based on the pre-set criteria, and through the processing of the stimulus by the controller, the controller transmits through the transmitting element the unique identifier of the bearing and/or bearing set, temperature information and/or status of the bearing to the truck receiver in order to communicate to the user without the use of unreliable cables and connectors.

Thus, varying electrical parameters of the temperature sensor lead to a varying input voltage of the controller.

Both, the device for monitoring the set of bearings and/or the temperature sensor comprise at least two electric parameters.

Thus, the electric parameter varies depending on the sensed operating temperature of said set of bearings and lead to a varying output voltage of the controller.

In this way, the temperature sensor is electrically connected to the controller of the device for monitoring the set of bearings.

The electrical connection between the individual temperature sensor and the controller of the device for monitoring the set of bearings can also be achieved through at least two terminals which connect the temperature sensor with said controller of the device through the PCB for monitoring the set of bearings.

At least one of the terminals is connected to an electrical supply, providing electric energy to the device for monitoring the set of bearings.

For the sake of redundancy, the communicative connection between the at least one temperature sensor and the controller of the device for monitoring the set of bearings can comprise more than two terminals. Thus, the reliability of the electrical connection is secured.

The specific location of the device for monitoring a set of bearings on the hub of a wheel (carrier) and the susceptibility of the device for monitoring the set of bearings to a large environment and/or to mechanical vibrations can lead to defective hard wired connections between the device for monitoring the temperature of a set of bearings and the receiver at the user end, typically driver console in the cabin.

Thus, the device for monitoring the set of bearings comprises a wireless communicative connection between the temperature sensor device and the receiver of the device for monitoring the set of bearings.

The controller of the device for monitoring the set of bearings comprises a signal processing unit to condition the output signal.

Controller

The device for monitoring the set of bearings comprises a controller, preferably a microcontroller. The controller is composed as a semi-conducting chip. The controller comprises a processor.

Said controller also provides a number of peripheral functions. Among other items, said peripheral functions comprise a working memory and/or a program memory.

In general, the controller is a one-chip computer system.

Electrical Energy Supply

According to the invention, the device for monitoring the set of bearings comprises an electric energy power supply.

The device for monitoring the set of bearings is driven with electrical energy. To provide the electric energy to the device for monitoring the set of bearings a magnet is movingly arranged in a center of a metallic coil of the device for monitoring the set of bearings.

The hub of the wheel bounces up and down when the vehicle is driving on a solid ground. The bouncing movement of the magnet relative to the coil is created by the chassis of the vehicle moving vertically relative to the multitude of wheels.

When the vehicle is moving, the magnet bounces up and down in the center of the coil, following the direction of gravity and being repulsed by a spring, arranged both in the center and on the bottom of said coil.

Example

Wheel—Hub of the Wheel (Carrier)—Set of Bearings

The device for monitoring the operating temperature of at least one set of bearings of a wheel of a multitude of wheels of a vehicle, wherein a set of bearings is arranged preferably, but not exclusively radially between a shaft and the hub of the wheel (carrier) is explained in the following example:

The hub of said wheel (carrier) represents a critical sub-assembly of the wheel of the vehicle, preferably of a truck.

The sub-assembly comprises a number of components vital for the function and for the safety of the vehicle when driving.

Among other things, the components of the sub-assembly comprise the braking system and the drive shaft of a vehicle. Depending on the type of vehicle (truck) there is at least one driven axle and at least one non-driven axle. The non-driven axle may be referred to as a shaft.

The axle and/or the shaft of the truck each carry at least two wheels. Heavy trucks also provide two parallel wheels on either side of the shaft or the axle.

The hub of the wheel, couples the shaft or the axle with the wheel. To allow a rotatable movement between the shaft or the axle and the hub there is the set of bearings.

The set of bearings, preferably a set of ball bearings, comprises a plurality of balls arranged between inner and outer races.

On the inside of the set of bearings a lubricant prevents two metal parts (races and balls of the set of bearings) from directly rubbing against each other. Thus, the lubricant prevents the operating temperature inside the set of bearings from rising above the at least one threshold temperature.

When driving, there is the risk that at least one of the hubs (carrier) and/or the corresponding wheel of the truck is damaged due to an overheated sets of bearings.

Threshold Temperature

In the example, said threshold temperature is reached and/or exceeded by the operating temperature of the set of bearings.

When the operating temperature of the set of bearings exceeds the threshold temperature the lubricating oil and/or the lubricating grease enclosing the balls between the races of the set of bearings deteriorates.

By way of example, a first threshold temperature is set at 110° C. A second threshold temperature is fixed at 115° C., whereas a third threshold temperature has a value of 120° C.

It goes without saying, that said threshold temperatures can also be set at different values with the intervals between data acquisition periods being set closer to each other as the bearing temperature increases to the critical temperature.

In the example the operating temperature exceeds the first threshold temperature of 110° C.

When the operating temperature exceeds the first threshold temperature of 110° C. the device for monitoring the set of bearings, comprising the temperature sensor, is activated at a time interval of every 15 minutes.

Thus, every 15 minutes the temperature sensor module performs a data acquisition cycle and sends a processed signal to the receiver, whether or not that the specific set of bearings has reached an operating temperature of 110° C.

In the example the operating temperature of the individual set of bearings reaches a second threshold temperature of 115° C.

Now, the temperature sensor of said individual set of bearings of the hub of the wheel (carrier) measures the operating temperature of the individual set of bearings every 10 minutes. When the measurement has been performed every 10 minutes, a signal from the temperature sensor module will transmit to receiver device for monitoring a set of bearings. Every 10 minutes, this signal tells the receiver module; whether or not the operating temperature of the individual set of bearings is still at 110° C.

By way of example, the signal of the temperature sensor of the device for monitoring a set of bearings indicates to the controller, whether the operating temperature has sunk below the threshold temperature of 110° C. or whether the threshold temperature of 110° C. has reached or exceeded 115° C.

The controller of the device for monitoring the set of bearings triggers another warning signal to the driver/receiver in that the operating temperature of the individual set of the bearings has exceeded the second threshold temperature of 115° C.

As soon as the second threshold temperature of 115° C. is reached, the time interval between two measurements effected by the device for monitoring a set of bearings is shortened to every ten minutes.

In other words, as soon as the second threshold temperature of 115° C. is reached by the set of bearings, the operating temperature of the set of bearings is measured every ten minutes. In the example, the temperature sensor detects that the operating temperature of the individual set of bearings has now reached 120° C.

Via the controller of the device for monitoring the set of bearings, a signal (warning) is sent to the driver/receiver that the individual set of bearings has now reached a temperature of 120° C.

At this stage the immediate halt of vehicle and further technical assistance is required.

When the individual set of bearings reaches the threshold temperature of 120° C., the measurement of the operating temperature of the individual set of bearings is performed every five minutes.

Should, for whatever reason, the operating temperature of the individual set of bearings sinks from 120° C. to 115° C. or further, the time interval between two measurements can also be prolonged.

Identification of the Affected Set of Bearings by the Controller

The controller identifies the individual set of bearings exceeding at least one threshold temperature, among at least two sets of bearings when transmitting the message to the receiver—every set of bearings is pre-allocated a known identifier code as part of the message.

The identification of the individual set of bearings performed by the controller comprises the designation of the axle or shaft on which the individual set of bearings is located. The identification further comprises the exact position of the individual set of bearings on the designated axle or shaft.

By way of example, as seen in the direction of travel, the individual set of bearings is located on the second axle (a non-driven shaft) of the vehicle.

Also, in the direction of travel the individual set of bearings is positioned on the outside wheel on the right hand side of said second axle.

Code Number

Another aspect of the inventions assigns at least one code number to each set of bearings.

The code number identifies the individual set of bearings. In that, the code number indicates on which axle or shaft each set of bearings is located. The code number also indicates the exact position of the set of bearings on the axle or shaft.

Said individual code number is a unique code number, which is established during the installation of the hub of a wheel.

Time Intervals for Measuring the Operating Temperature of the Set of Bearings

The at least two sets of bearings of the wheel of a multitude of wheels (carrier) of the vehicle are continuously checked to see if the operating temperature of the individual set of bearings exceeds one of several threshold temperatures.

Depending on which of said threshold temperatures is exceeded, the time interval between two measurements performed by the temperature sensor is reduced or increased.

Also, for security reasons the driver is informed about which of the wheels of his vehicle comprises the set of bearings that is in danger of overheating.

In case, the set of bearings overheats, the lubricant (e.g. grease) inside the set of bearings dries up and/or leaks out through a seal. As a consequence, the lubricant inside of the set of bearings loses its lubricating ability.

This results in the temperature and friction to increase without control resulting in the eventual wear and destruction of the bearing with resulting down-time, potential fire and loss of control of the vehicle.

By way of example the threshold temperature may be 120° C.

Once said threshold temperature of 120° C. is exceeded by the operating temperature of the hub of a wheel a failure of lubrication within the bearings leads to a rapid and sudden failure of set bearings on the individual hub of a wheel.

The device for monitoring the set of bearings, comprising the temperature sensor is fixed onto said hub of a wheel (carrier). The temperature sensor of said device for monitoring the set of bearings is arranged as close as possible to the surface of the casing of the set of bearings.

Cavity

At least one temperature sensor of the device for monitoring a set of bearings has at least one cavity facing towards the set of bearings. The cavity is filled with a thermally conductive and/or adhesive compound.

Often, a cavity or void remains between the at least one temperature sensor and the set of bearings.

The cavity is filled with a thermally conductive and/or an adhesive compound. Said thermally conductive and/or adhesive compound is applied to the at least one temperature sensor prior to the installation of the temperature sensor filling the cavity between said temperature sensor and the casing of the set of bearings.

In other words, to optimize a transfer of heat resulting from the operating temperature of the set of bearings, surrounding the shaft, to the temperature sensor of the device for monitoring the set of bearings, any gap and/or void left between the temperature sensor and the set of bearings is filled with a conductive and/or adhesive material.

DESCRIPTION OF THE DRAWINGS

Aspects of the invention as well as further advantages of the invention are shown in the following drawings.

DETAILED DESCRIPTION

Figure 1:
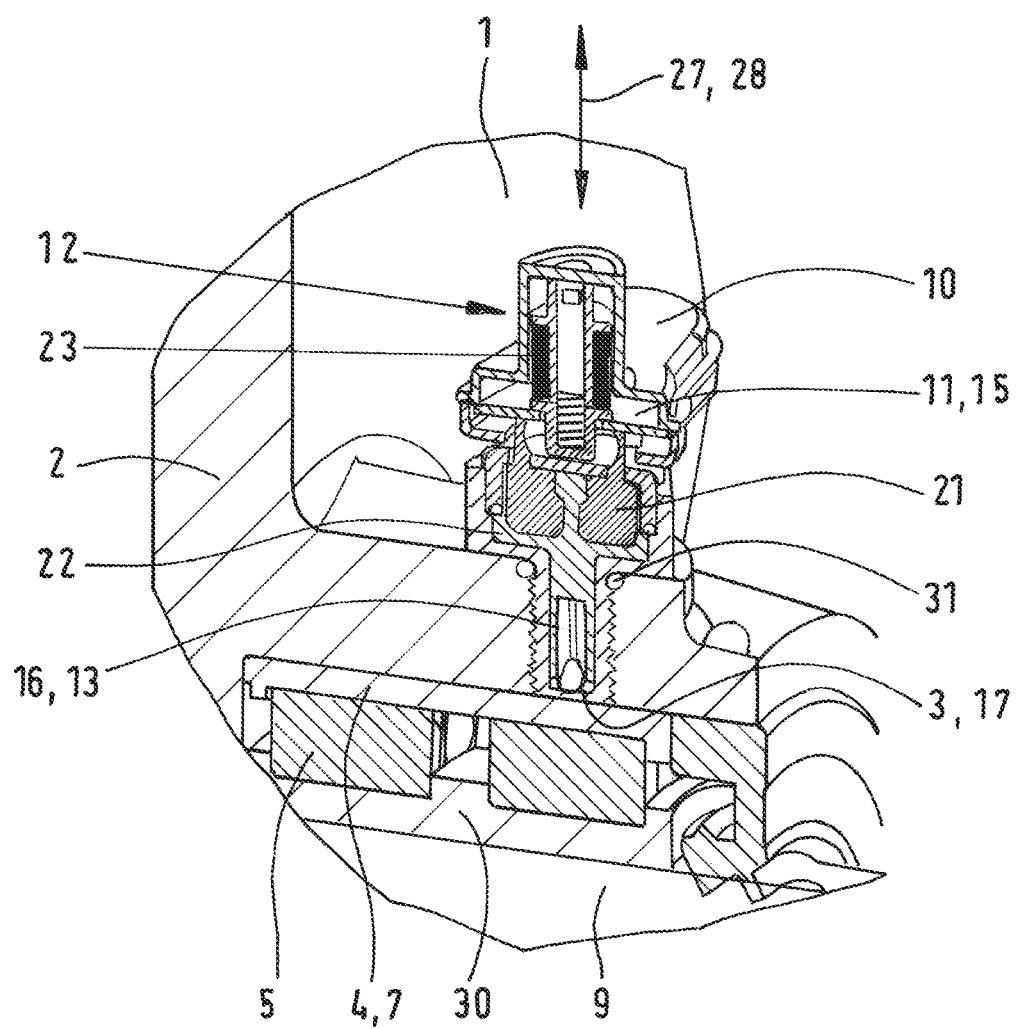
FIG. 1 shows the device for monitoring the set of bearings mounted on a hub of a wheel (carrier).
Figure 2:
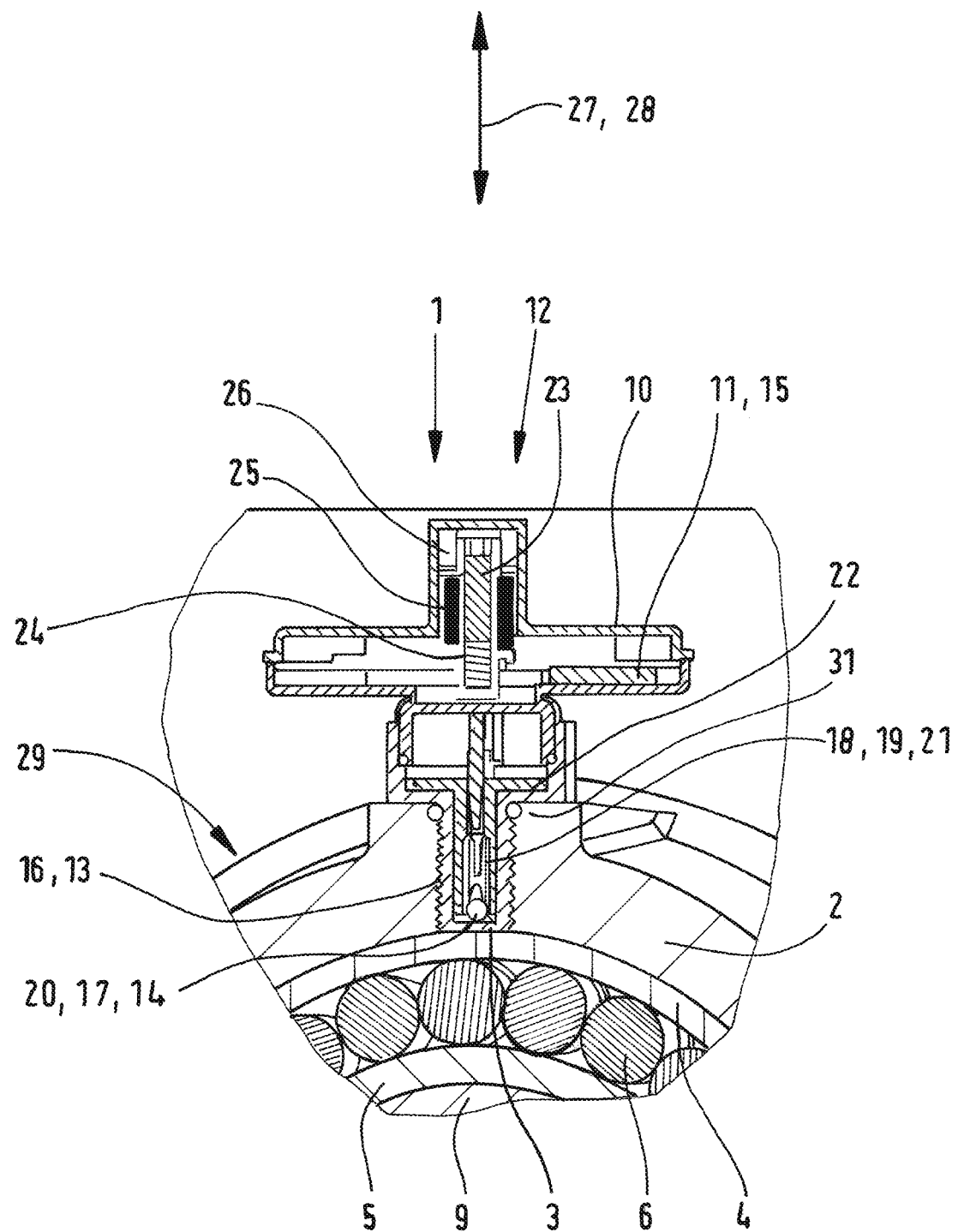
FIG. 2 shows the device for monitoring the set of bearings with its temperature sensor bordering the set of bearings.
Figure 3:
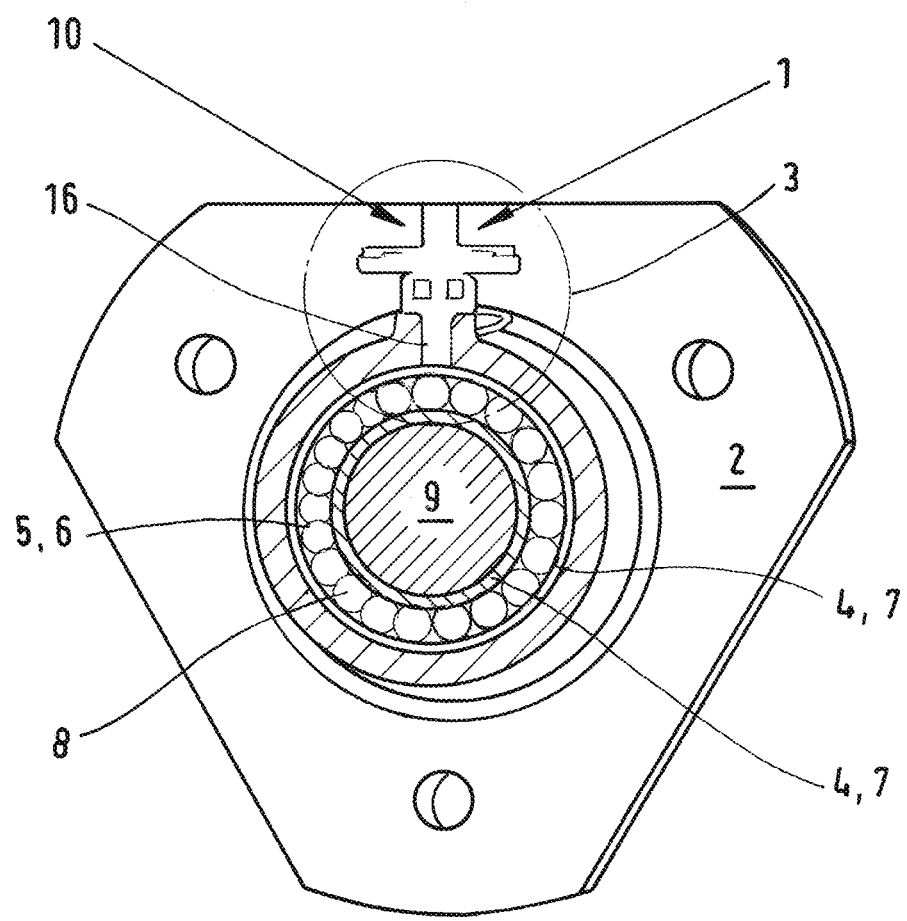
FIG. 3 shows a front side of a hub of a wheel (carrier) arranged on the shaft or axle over a set of bearings.

The FIGS. 1 to 3 show a device for monitoring a set of bearings 1 which is mounted onto a hub of a wheel 2 (carrier).

The device for monitoring the set of bearings comprises a temperature sensor 3 which is positioned neighboring and/or adjacent to set of bearings 5. The set of bearings 5 comprises a casing 4.

In the FIGS. 1 to 3, the set of bearings 5 is designed as a ball bearing, comprising two rolls of balls 6.

The balls 6 of the set of bearings 5 are arranged adjacent to each other within races 7 of the set of bearings 5.

A lubricating grease 8 is arranged inside of the set of bearings 5.

Said lubrication grease 8 avoids at least two separate mechanical components rubbing against each other. Lubricating grease 8 avoids friction between the balls 6 of the set of bearings 5 and the races 7. Said friction between the metal components of the set of bearings 5 leads to an augmentation of the operating temperature in the set of bearings.

A shaft or axle 9 is rotatably mounted within the hub 2 of a wheel over a set of bearings 5.

The device for monitoring the set of bearings 1 comprises a housing 10 which is manufactured of a thermally conductive material.

The housing 10 houses the at least one component of the device for monitoring the set of bearings 1.

Among other things, the component of the device for monitoring the set of bearings 1 can be a printed circled board (PCB) 11.

Within the housing 10 of the device for monitoring the set of bearings 1 there is an energy harvesting system 12. The components can also be an energy storing device 32 and/or a rectifier 34. A further component can be an energy storing device charger 32 (all not shown).

The housing 10 of the device for monitoring the set of bearings 1 also houses a transceiver circuit 35 and/or an antenna 36 or a radio frequency module (RF-Module). Said components of the device for monitoring the set of bearings 1 are not depicted in the FIGS. 1 to 3.

The housing 10 of the device for monitoring the set of bearings 1 comprises a cylindrical portion 13.

The device for monitoring the set of bearings 1 is arranged on the outer circumference 29 of the hub 2 of the wheel (carrier). Whereas the cylindrical portion 13 protrudes into the hub of the wheel 2.

The cylindrical portion 13 has a thin wall. On the bottom 14 of the cylindrical portion 13, facing towards the set of bearings 5 there is a temperature sensor 3 arranged bordering and/or neighboring and/or adjacent to the set of bearings 5.

The set of bearings 5 comprise outer and inner races 7 between which the balls of the set of bearings 5 are arranged.

The temperature sensor 3 has electrical parameters that vary with the operating temperature measured by said set of bearings 5.

Also, the electrical parameters, varying with the sensed operating temperature of the set of bearings 5 lead to a varying output voltage of a controller 15 of the device for monitoring a set of bearings 1.

One parameter, which is critical for all sets of bearings 5 is the maximum operating temperature of the set of bearings 5. Typically, when the operating temperature of the set of bearings 5 has reached and/or exceeded 120° C., the lubricant inside the set of bearings 5 deteriorates. Or, fluid lubricant leaks out through damaged seals 31.

The varying output voltage can be measured along a fully predetermined temperature showing values, typically ranging from −40° C.-120° C.

The cylindrical portion 13 of the device for measuring the set of bearings 1 is fitted inside a recess 16 of the hub 2 of wheel (carrier).

The cylindrical portion 13, comprising the temperature sensor 3, is fitted into the recess 16 of the hub 2 of the wheel, positioned as close as possible to the set of bearings 5, by a tolerance stack-up to the set of bearings 5, having inner and outer races 7.

In the FIGS. 1 to 3 a cavity 17 is arranged between two arms 18, 19 of the temperature sensor 3. Thus, the cavity 17 is arranged between the arms 18, 19 of the temperature sensor 3.

Being arranged between the arms 18, 19 of the temperature sensor 3 the cavity 17 is directed towards the set of bearings 5.

Any cavity 17 between the arms 18, 19 of the temperature sensor 3 and the set of bearings 5, having races 7, is filled with a conductive and/or adhesive compound 20.

Filling the cavity 17 of the temperature sensor 3 with the conductive and/or adhesive compound 20 reduces the negative effect of a deteriorating transfer of the heat from the set of bearings 5 to the temperature sensor 3.

The cavity 17 hampers the transfer of the operating temperature from the set of bearings 5, having races 7, to the temperature sensor 3.

Said conductive and/or adhesive compound 20 is filled into the cavity 17 to improve the transfer of the operating temperature from the set of bearings 5 to the temperature sensor 3.

The temperature sensor 3 is fixed rigidly to the controller 15 of the device for monitoring the set of bearings 1.

Said controller 15 is designed as the PCB 11.

Said arms 18, 19 of the temperature sensor 3 are connected to the controller 15 by means of transmitting elements 21.

The arms 18, 19 of the temperature sensor and/or the transmitting elements 21 are supported by a carrying structure 22.

The controller 15 transfers the signal, received from the temperature sensor 3 to at least one receiver including a display device of the driver (not shown) in the drivers cabin.

The temperature sensor 3 is fixed rigidly to said carrying structure 22. The temperature sensor 3 is connected to the controller 15 (PCB 11) in a direct manner. The temperature sensor 3 may also be connected with the controller 15 by means of the transmitting elements 21 (not shown).

Said transmitting elements 21 (not shown) form an integral part of said carrying structure 22.

In the FIGS. 1 to 3 the controller 15 (PCB 11) is made up of a plurality of components.

Said components are an energy storage device and/or a rechargeable battery 33. The component may also be a super capacitor or the energy harvesting system 12.

The component can also be a rectifier 34 or an energy storage device charger 32 and monitor.

Also it can be a transceiver circuit 35 including an antenna 36.

The energy harvesting system 12 shown in the FIGS. 1 to 3 is arranged within in housing 10 of the device for monitoring a set of bearings 1.

The energy harvesting system 12 comprises a cylindrical magnet 23.

The magnet 23 is suspended on a spring element 24.

The magnet 23 moves vertically inside a coil 25.

Said coil 25 is made of copper wire which is wound on a bobbin 26.

Thus, electrical energy is generated in form of an alternating current (AC).

Said alternating current is rectified and the voltage is regulated.

The current generated by the energy harvesting system 12 is used to charge a super capacitor or a battery 33 (not shown).

To further increase the efficiency of the energy harvesting system 12 describe above, the magnet 23 is arranged with an orientation of the magnet 23 perpendicular to the shaft 9.

When the truck drives on a solid ground (road) the hub of the wheel 2 bounces up and down with the wheel of the truck.

Thus, the magnet 23 moves in a direction of gravity 27 within the coil 25.

It goes without saying that the magnet 23 moves in the direction of gravity 27 and in the opposite direction 28.

Figure 4:
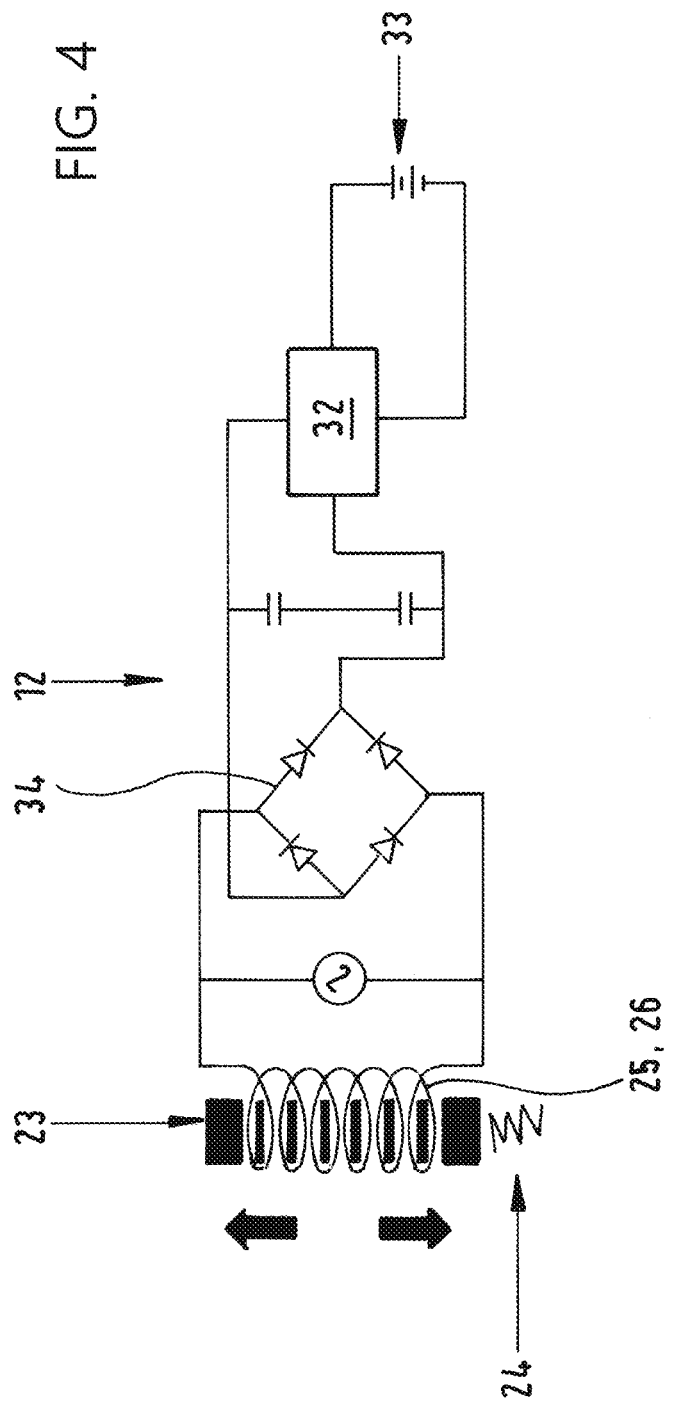
FIG. 4 features the functional diagram of the energy harvesting system.

FIG. 4 features the functional diagram of the energy harvesting system 12. The energy harvesting system 12 comprises a cylindrical magnet 23. The cylindrical magnet 23 is suspended on a spring element 24. Said spring element 24 moves axially inside a copper wire coil 25. The copper wire coil 25 is wound on a bobbin 26 thus generating electric energy in form of an alternating current (AC).

The alternating current is rectified. Also, the alternating current voltage regulated. A battery charger 32 is arranged to charge a battery 33. Alternatively, the battery 33 can also be designed as a super capacitor.

In order to increase the efficiency of the energy harvesting system 12, the energy harvesting system 12 may comprise with an orientation of the moving magnet 23 in a direction, perpendicular to the solid ground.

In the FIG. 4 the PCB 11 (not shown) comprises the energy storing system 32 (battery 33; super capacitor). The energy storing system 32 also has an energy harvesting system 12 as well as a rectifier 34.

The rectifier 34 changes the alternating current (AC) to direct current (DC).

In the FIG. 4 the battery charger 32 is also described as an energy storage device charger, comprising a monitor.

Figure 5:
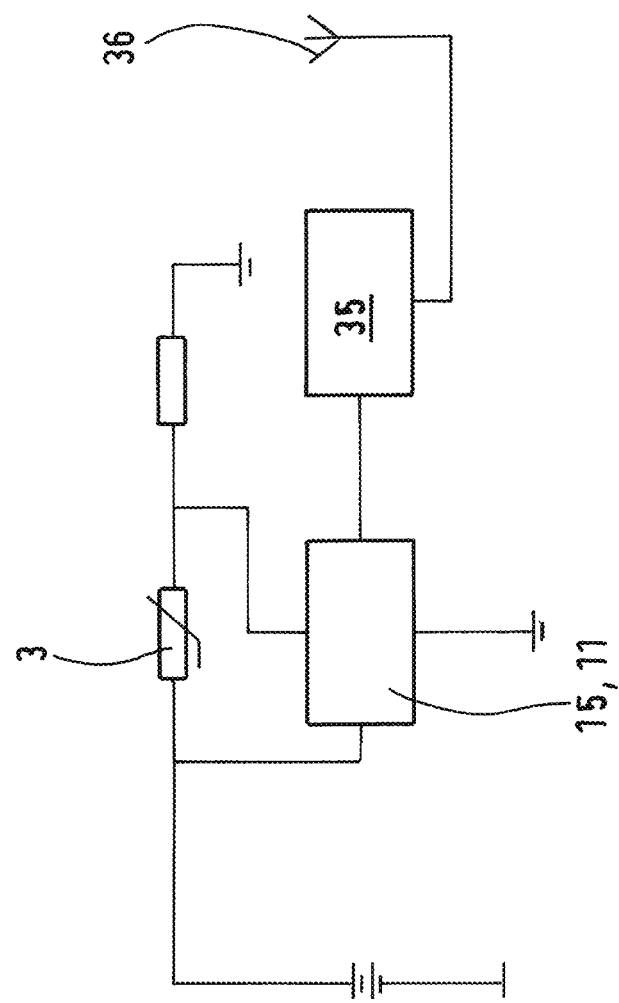
FIG. 5 shows the receive—transmit functional diagram of the device for monitoring the set of bearings.

The FIG. 5 shows the receive-transmit functional diagram of the device for monitoring the set of bearings 1 (not shown).

In the FIG. 5 a temperature sensor 1 is rigidly fixed to a carrying structure 22 (not shown). The temperature sensor 3 is connected to the PCB 11 (also not shown), either directly or through the transmitting element 21.

Both the temperature sensor 1 and the PCB 11 as well as the transmitting elements 21 (not shown) form an integral part of the carrying structure 22.

The controller 15, the transceiver circuit 35 and an antenna 36 are also part of the PCB 11 assembly.

Figure 6:
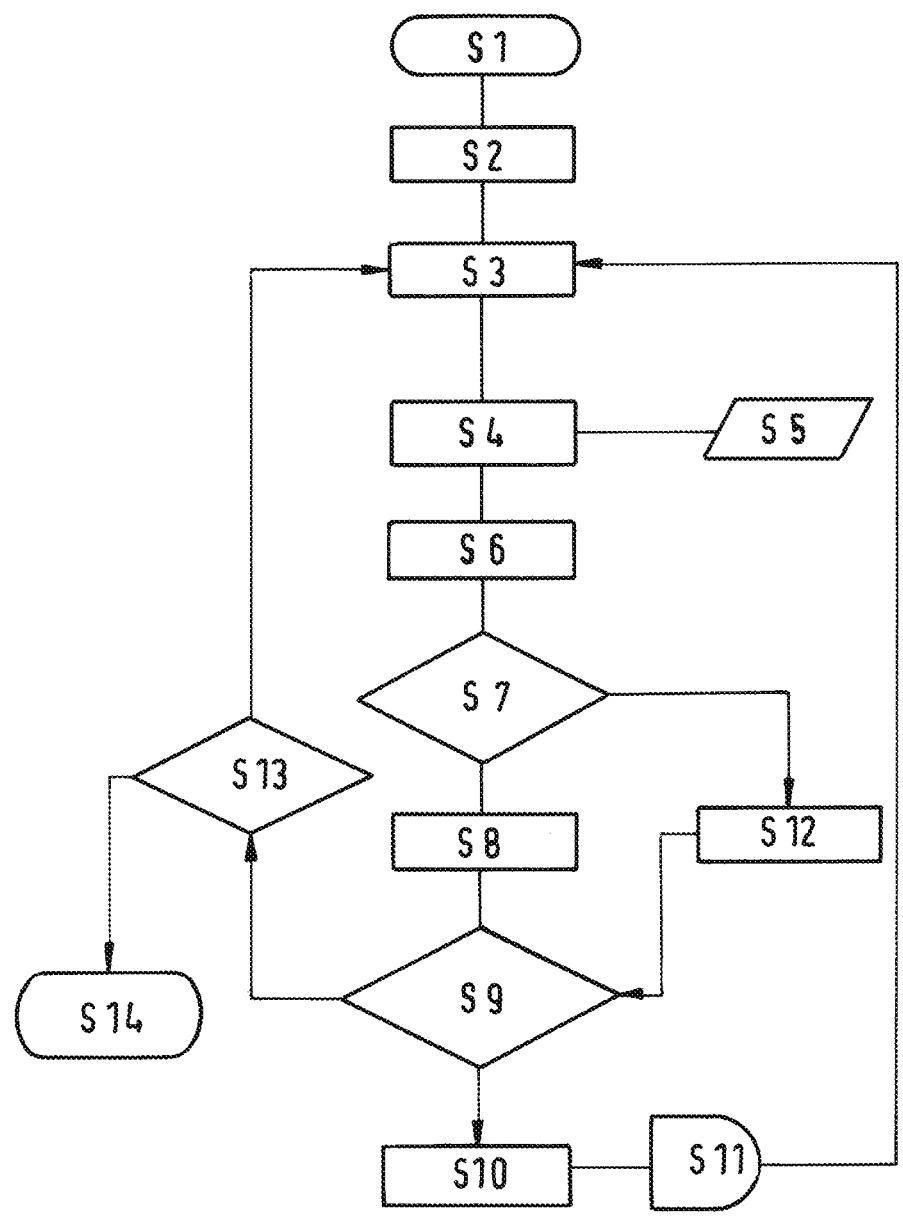
FIG. 6 shows a flow chart representing the communicative connection between the temperature sensor and the controller of the device for monitoring a set of bearings.

FIG. 6 shows a flow chart representing the communicative connection between the temperature sensor 3 (not shown) and the controller 15 (not shown) of the device for monitoring a set of bearings 1 (not shown).

The FIG. 6 shows a flow chart having various steps, ranging from steps 1 (S1) to step 14 (S14).

In S1 the power of the vehicle is switched on.

All data necessary for running the vehicle are requested from the various systems of the vehicle in the step S2.

The step S3 represents the step, at which the controller 15 wakes up the device for monitoring the set of bearings 1, comprising the temperature sensor 3.

The acquisition of data is performed in step S4. In this step, preferably, but not exclusively, various data such as the operating temperature of the individual set of bearings 5 and/or the state of charge of the battery 33 is acquired and collected. It goes without saying that in the step S4 other data can also be acquired and/or collected.

The various data which are acquired and special collected are listed in the step S5. The conditioning of the data takes place in step S6, wherein a data management takes place and further optimization techniques are applied to said data.

The conditioning of the data also implies an intelligent routing and/or a protection of the data for further data storage.

In this step S7, it is determined, whether the data are within a preset valid range.

In the step S7 the operating temperature of the individual set of bearings 5 is checked, as to whether at least one threshold temperature is reached or exceeded.

The data and/or information gathered in the step S7 is transferred to the controller 15.

Also, in the step S8, each set of bearings 5 is assigned an individual code number. By means of the individual code number the controller 15 of the device for monitoring the set of bearings 1 identifies the individual set of bearings 5 exceeding at least one threshold temperature.

By means of the individual code number the individual set of bearings 5 exceeding at least one threshold temperature can be allocated to the corresponding wheel of the vehicle.

In the step S9 the controller 15 checks, whether the operating temperature of each of the sets of bearings 5 reach and/or exceed at least one threshold temperature.

In the step S10 the controller sends the device for monitoring a set of bearings 1 "to sleep" when the result of the step S9 indicates that the operating temperature of each of the individual sets of bearings 5 are still below the various threshold temperatures.

Depending on whether or not at least one threshold temperature is exceeded by the operating temperature of the individual sets of bearings 5, in the step S11 a time interval is set.

The time interval indicates the time gaps between the moments when the device for monitoring the set of bearings 1 is activated. When the device for monitoring the set of bearings 1 is activated the temperature sensor 3 measures the operating temperature of each individual set of bearings 5.

The measured operating temperature of the individual set of bearings 5 is transferred to the controller by means of the transmitting element 21.

In the step S12 a transaction ID is released and further diagnostics are performed when in step S7 the data are not within the valid range.

When the necessary efforts of step S12 are performed the system is led back to step S9.

In the step S13 and is checked whether in the step S9 the complete set of data has been gathered.

If this is not the case, the driver receives a warning in that at least one of the temperature sensor is issues faulty results (S14).

When the step S13 and S11 has been successfully fulfilled the system is led back to the step S3.

LIST OF REFERENCES 1 device for monitoring a set of bearings
2 hub of wheel (carrier)
3 temperature sensor
4 casing of the set of bearings
5 set of bearings
6 balls of the set of bearings
7 races of the set of bearings
8 lubricating means
9 shaft/axle
10 housing of the device for monitoring the set of bearings
11 PCB
12 energy harvesting system
13 cylindrical portion
14 bottom of cylindrical portion
15 controller
16 recess
17 cavity
18 arm
19 arm
20 conductive/adhesive component
21 transmitting element
22 carrying structure
23 magnet
24 spring element
25 coil
26 bobbin
27 direction of gravity
28 opposite direction of gravity
29 outer circumference
30 free
31 seal
32 battery charger
33 battery
34 rectifier
35 transceiver circuit
36 antenna

The invention claimed is:

1. A device for monitoring the operating temperature of at least one set of bearings in a plurality of sets of bearings, wherein the at least one set of bearings is arranged between a shaft and a carrier, the carrier having at least one temperature sensor adapted and configured to sense the temperature of the at least one set of bearings and generate a signal representative of an operating temperature of the at least one set of bearings, the at least one temperature sensor being operatively electrically connected to at least one controller, the controller being adapted and configured to process the signal from the temperature sensor, including determining the operating temperature of the respective at least one set of bearings and whether the operating temperature of the respective at least one set of bearings exceeds at least one threshold temperature, the controller storing in a memory of the controller a unique identifier associated with the at least one bearing set, the at least one temperature sensor facing radially towards an outer surface of the at least one set of bearings and being arranged on a bottom of a cylindrical portion of a housing of the device for determining the operating temperature of the respective at least one set of bearings, and wherein a code number indicates on which axle or shaft a respective set of bearings in the plurality of sets of bearing is located.

2. The device according to claim 1, wherein the at least one temperature sensor is arranged in a recess of the carrier.

3. The device according to claim 1, wherein the at least one temperature sensor has at least one cavity facing towards the respective set of bearings, with the cavity being filled with a thermally conductive and/or adhesive compound.

4. The device according to claim 1, wherein the at least one temperature sensor is operatively electrically connected to said controller by means of at least one transmitting element.

5. The device according to claim 1, wherein the device has at least one electrical parameter that varies depending on the sensed operating temperature of the respective at least one set of bearings, the at least one varying electrical parameter being adapted and configured to provide a varying input voltage into the at least one controller.

6. The device according to claim 1, wherein the at least one temperature sensor is positioned adjacent to the set of bearings.

7. The device according to claim 1, wherein a time interval between individual measurements performed by the at least one temperature sensor is varied based upon on the sensed operating temperature of the set of bearings.

8. The device according to claim 1, further comprising at least one of a printed circuit board (PCB), a rectifier, a transceiver circuit, an antenna, a radio-frequency module (RF-module).

9. The device according to claim 1, further comprising at least one of an energy harvesting system, an energy storing device, an energy storing device charger.

10. The device according to claim 1, wherein the device is powered by an electrical harvesting system.

11. The device according to claim 10, wherein the electrical harvesting system comprises a magnet adapted and configured to move in a center of a coil in a direction of corresponding to gravity and in a direction opposite to the direction of gravity, wherein the magnet is supported by a spring.

12. The device according to claim 1, wherein each set of bearings in the plurality of the sets of bearings is assigned a unique identifier.

* * * * *